United States Patent Office 2,767,215
Patented Oct. 16, 1956

2,767,215

PREPARATION OF VERBENONE

Joseph P. Bain and Wilbur Y. Gary, Jacksonville, Fla., assignors to The Glidden Company, Cleveland, Ohio, a corporation of Ohio No Drawing. Application April 30, 1953,
Serial No. 352,292

6 Claims. (Cl. 260—587)

The present invention relates to the preparation of verbenone.

Verbenone is a constituent of certain essential oils and has an odor reminiscent of both camphor and peppermint. It is therefore useful as an odor or flavor chemical as well as an intermediate in the production of other aromatic terpene compounds. Verbenone has been produced by air oxidation of α-pinene, but, as stated by Simonsen, The Terpenes, vol. 2, page 335, the yields of the ketone are poor by the known prior art methods. In the copending application of Bain et al., Serial No. 352,291, filed April 30, 1953, there is disclosed a method for obtaining a new alcohol from the air oxidation mixture of α-pinene. This new alcohol, 3-pinene-2-ol, is obtained in substantial yield, which is considerably in excess of the yield of verbenone directly obtained by the procedures disclosed in the above referred to application. Conversion of the 3-pinene-2-ol to verbenone would therefore result in a substantially increased yield of verbenone.

It is therefore an object of the present invention to provide a process for producing verbenone.

Another object is to provide a process for producing optically active verbenone.

Other objects will be apparent from the following description.

It has been found that the foregoing objects can be accomplished by subjecting the 3-pinene-2-ol to an oxidation with chromic acid. The reaction is illustrated by the following equation:

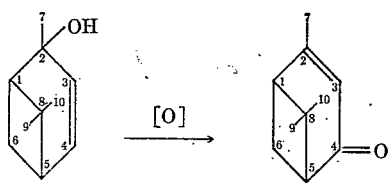

As shown in application Serial No. 352,291, the 3-pinene-2-ol can be produced by treating the oxidation mixture resulting from the air oxidation of α-pinene with sodium sulfite or other suitable reducing agent under alkaline conditions, and then fractionally distilling the reduced mixture, the fractions boiling at 75° C. to 85° C., at 10 mm., being enriched in the cis- and trans-forms of 3-pinene-2-ol. Since the lower boiling form of this alcohol also possesses the lower refractive index and density, it has been assigned the trans-configuration in accordance with the Auwers-Skita rule, and the higher boiling form is assigned a cis-configuration.

When an optically active 3-pinene-2-ol is employed in the present invention, the verbenone will be optically active, the optical activity of the ketone being proportional to the optical activity of the alcohol. Similarly, the optical purity of the total 3-pinene-2-ol produced by the air oxidation and reduction of the resulting mixture is proportional to the optical activity of the α-pinene.

The direction of the rotation of the verbenone is of the same sign as that of the original α-pinene from which it was prepared and has a sign opposite to that of the 3-pinene-2-ol.

The following examples are illustrative:

Example 1 d-Alpha-pinene was blown with air at 50° C. until a peroxide value of about 2000 was attained. The product was reduced by agitating it with an excess of sodium sulfite solution at 80° C., then fractionated. From fractions boiling at about 80–85° C. at 10 mm., there was obtained cis-3-pinene-2-ol which was purified by crystallization to a product showing $[\alpha]_D^{25}$ —130°, $n_D^{55}$ 1.4776, $d_4^{55}$ 0.9477 and freezing point 46° C.

Pure l-cis-3-pinene-2-ol (107 grams) was dissolved in 75 cc. heptane and this solution was mixed with a solution of 105 grams sodium dichromate in 438 cc. water. During a 30-minute period, 175 grams of a 50% solution of sulfuric acid in water was added slowly while the reaction mixture was maintained below 32° C. by means of cooling with an ice bath. It was then maintained at 39–40° C. for 30 minutes. The oil phase was washed with water, 5% sodium hydroxide, then further with water. Fractionation yielded 77 grams of pure verbenone distillate, $[\alpha]_D^{25}$ +269°. Identification was made by comparison of the infrared spectrum with that of pure verbenone. Correspondence of the spectra was almost exact indicating the high purity of the product.

Example 2

14 grams of d-trans-3-pinene-2-ol, M. P. 44° C., $[\alpha]_D^{26}$ +24.4° (isolated by crystallization from a fraction boiling at 76° C. at 10 mm., obtained from the reduction products of air oxidized l-pinene), was dissolved in 5 cc. heptane and agitated with a solution of 13.8 grams of sodium dichromate in 57 cc. water. There was added 24 grams of 50% $H_2SO_4$ dropwise. Cooling was used to maintain the temperature below 45° C . After addition of all the acid, the mixture was agitated for 30 minutes longer. After addition of 15 cc. additional heptane, the oil phase was separated and washed with water and sodium carbonate solution. The heptane was removed in vacuo, leaving the product as a residue. Infrared analysis showed the product to be verbenone containing a little unreacted trans-3-pinene-2-ol. The verbenone was the l-form.

Example 3

Alpha-pinene showing $\alpha_D^{25}$ +19.6 (10 cm. tube) was air oxidized at 50° C. to a peroxide value of about 2000. The whole mixture of unreacted pinene and hydroperoxides was reduced with an excess of aqueous sodium sulfite at 80° C. and then fractionated by distillation. A distillate fraction boiling at 85° C. at 10 mm., and which was almost pure cis-3-pinene-2-ol, was oxidized with sodium dichromate and sulfuric acid according to the procedure shown on page 340, Gilman and Blatt, Organic Synthesis, volume I, 2nd edition, for the oxidation of menthol to menthone. The product was fractionated to obtain pure verbenone in 73% yield, various fractions of which showed optical rotations of +123 to +129° (10 cm. tube).

There is shown in the examples the oxidation of optically pure forms of cis- and trans-3-pinene-2-ol which are isolable from the air oxidation products of optically active pinene. It will be appreciated that mixtures of these can be employed in carrying out this invention and that the optical activity of the 3-pinene-2-ol is of significance only in that it determines the optical activity of the verbenone produced. Thus, racemic 3-pinene-2-ol yields racemic verbenone. It will be further appreciated that pinene of any optical activity can be employed as a source of the 3-pinene-2-ols, and when whole distillate fractions of the reduction products of pinene hydroperoxides, boiling within the range of about 75 to 85° C. at 10 mm., are employed in carrying out this invention, the optical rotation of the verbenone produced will be proportional to the optical activity of the starting pinene. However, since the optically active forms of the 3-pinene-2-ols are higher melting than the corresponding racemic forms, the whole distillate fraction, boiling within the range of about 75 to 85° C. at 10 mm., can be partly crystallized and separated as by means of centrifuging into a crystalline product and into a liquid product; whereupon the crystalline product yields on oxidation verbenone of higher optical purity than was the starting alpha-pinene, if the pinene contained racemic and active pinene, whereas the liquor from the centrifuging on oxidation yields verbenone of lower optical activity than that corresponding to the optical activity of the pinene. The rotation of optically pure alpha-pinene is not known with a high degree of certainty, but it is probably about plus or minus 40 to plus or minus 43° (10 cm. tube) whereas the verbenone produced from such optically pure pinene is about $[\alpha]_D^{25} \pm 269°$.

It will be appreciated also that other variations can be made without departure from the invention. Thus, chromic acid oxidation, other than the "Beckman" chromic acid oxidation, can be employed.

The 3-pinene-2-ol and its preparation, described herein, are more fully described and claimed in the application of Bain et al., Serial No. 352,291, filed April 30, 1953.

Having described the invention, what is claimed is:

1. The process for producing verbenone which comprises subjecting 3-pinene-2-ol to a chromic acid oxidation.
2. The process of claim 1 in which the 3-pinene-2-ol is optically active.
3. The process of claim 1 in which the 3-pinene-2-ol has the cis-form.
4. The process of claim 2 in which the 3-pinene-2-ol has the trans-form.
5. The process for producing an optically pure form of verbenone which comprises subjecting an optically pure form of 3-pinene-2-ol to a chromic acid oxidation.
6. The process of claim 1 in which the oxidation is effected by means of a Beckman chromic acid mixture.

References Cited in the file of this patent

UNITED STATES PATENTS 1,933,642    Tamura et al. _____ Nov. 7, 1933